(12) United States Patent
Jacobson et al.

(10) Patent No.: US 10,589,185 B2
(45) Date of Patent: Mar. 17, 2020

(54) METHODS AND SYSTEMS FOR ENHANCING COOLING POND PERFORMANCE AND SALT PRODUCTION IN A SOLUTION MINING OPERATION

(71) Applicant: The Mosaic Company, Plymouth, MN (US)

(72) Inventors: Kathlene Laurie Jacobson, Saskatoon (CA); Grant Shaver, Regina (CA); Rubeena Batta, Regina (CA); Carey Heinbigner, Moose Jaw (CA); Murray Schultz, Moose Jaw (CA)

(73) Assignee: The Mosaic Company, Plymouth, MN (US)

( * ) Notice: Subject to any disclaimer, the term of this patent is extended or adjusted under 35 U.S.C. 154(b) by 37 days.

(21) Appl. No.: 15/537,104

(22) PCT Filed: Dec. 18, 2015

(86) PCT No.: PCT/US2015/066601
§ 371 (c)(1),
(2) Date: Jun. 16, 2017

(87) PCT Pub. No.: WO2016/100784
PCT Pub. Date: Jun. 23, 2016

(65) Prior Publication Data
US 2018/0257000 A1    Sep. 13, 2018

Related U.S. Application Data

(60) Provisional application No. 62/093,823, filed on Dec. 18, 2014.

(51) Int. Cl.
*B01D 1/00* (2006.01)
*C01D 3/06* (2006.01)
*B01D 21/24* (2006.01)
*C01D 7/24* (2006.01)
*C02F 1/12* (2006.01)

(52) U.S. Cl.
CPC ......... *B01D 1/0082* (2013.01); *B01D 21/245* (2013.01); *B01D 21/2488* (2013.01);
(Continued)

(58) Field of Classification Search
CPC .. B01D 1/0082; B01D 21/24; B01D 21/2488; B01D 17/0211; B01D 1/00;
(Continued)

(56) References Cited

U.S. PATENT DOCUMENTS

| 3,372,691 A | 3/1968 | Shachar |
| 4,553,529 A | 11/1985 | Assaf et al. |
| 4,569,676 A | 2/1986 | Swinkels et al. |
| 5,017,043 A | 5/1991 | Assaf et al. |
| 2011/0085963 A1 | 4/2011 | Sadan |

FOREIGN PATENT DOCUMENTS

| CA | 1103894 A | 6/1981 |
| CN | 103225966 A | 7/2013 |

(Continued)

OTHER PUBLICATIONS

PCT International Preliminary Report on Patentability dated Jun. 29, 2017 for International Application No. PCT/US2015/066601, 11 pages.

(Continued)

*Primary Examiner* — Carib A Oquendo
(74) *Attorney, Agent, or Firm* — Patterson Thuente Pedersen, P.A.

(57) ABSTRACT

A cooling pond system and related methods of improving cooling performance in a cooling pond system using one or more submerged dams to increase cooling performance within the cooling pond system, and increase salt precipitation or recovery. The inclusion of one or more submerged dams within an existing cooling pond system can reduce an outflow temperature by 1-5° F. as compared to the same cooling pond system without any submerged dams. In addition or alternatively, pond depth can be controlled to enhance flow mixing and convection cooling. As the temperature is reduced throughout the cooling pond system, more potassium containing salts are precipitated from the
(Continued)

brine solution resulting in increased production or recovery within the same cooling footprint.

18 Claims, 11 Drawing Sheets

(52) U.S. Cl.
CPC .................. *C01D 3/06* (2013.01); *C01D 7/24* (2013.01); *C02F 1/12* (2013.01)

(58) Field of Classification Search
CPC ............ B01D 21/0003; B01D 21/2405; B01D 17/0208; F24S 10/10; C02F 1/04; C02F 1/048; C02F 1/12
See application file for complete search history.

(56) References Cited

U.S. PATENT DOCUMENTS

| RU | 2160225 | 12/2000 |
|---|---|---|
| RU | 49468 | 11/2005 |
| SU | 30623 | 5/1933 |
| SU | 1792916 | 2/1993 |

OTHER PUBLICATIONS

PCT International Search Report for international application No. PCT/US2015/066601, dated May 4, 2016, 3 pages.
PCT Written Opinion for international application No. PCT/US2015/066601, dated May 4, 2016, 9 pages.
Communication dated Sep. 28, 2018 for EP Application No. 15871151.5, 7 pages.
Office Action dated Oct. 9, 2018 for Chinese Application No. 201580076581X, 10 pages.
Search Report dated Apr. 25, 2019 for RU Application No. 2017125371, 5 pages.
Office Action dated Apr. 25, 2019 for RU Application No. 2017125371, 11 pages.
Office Action dated Nov. 29, 2019 for Belarus Application No. a20170270, 5 pages.

METHODS AND SYSTEMS FOR ENHANCING COOLING POND PERFORMANCE AND SALT PRODUCTION IN A SOLUTION MINING OPERATION

RELATED APPLICATIONS

The present application is a national phase entry of PCT Application No. PCT/US2015/066601, filed Dec. 18, 2015, which claims the benefit of U.S. Provisional Application No. 62/093,823 filed Dec. 18, 2014, which is incorporated herein in its entirety by reference.

FIELD OF THE INVENTION

The present application relate generally to cooling pond systems for the recovery of a salt from a salt solution, such as a source of brine. More specifically, the present application is directed to adjusting cooling pond depth and/or placing one or more submerged dams to enhance surface convection and to control flow mixing, thereby increasing salt recovery or production from a salt solution, such as brine.

BACKGROUND OF THE INVENTION

Salt recovery or precipitation is used in various industries to recover a desirable or usable naturally occurring salt product suspended or dissolved in a fluid. For example, potassium chloride, or potash, is a salt that is naturally occurring and usable in a variety of applications such as for fertilizer, food, and pharmaceuticals. Potash is generally produced through two methods, conventional mining techniques and solution mining depending upon deposit depth and geology. Solution mining is often used in situations where the deposits are too deep or too thin for conventional mining techniques, and solution mining generally creates minimal surface disturbance and little waste compared to conventional mining. Other advantages of solution mining include the fact that impurities can be readily removed allowing for the production of high-grade salt for other uses, including food, chemical, and pharmaceutical manufacturing. Additionally, any impurities (i.e., insolubles) are readily disposed of by reinjecting them into a solution mining cavern.

In solution mining, heated fluid, for example, heated water or a heated, salt saturated brine, is pumped into a cavern holding deposits of potash or potassium containing salts including sylvite (i.e., potassium chloride), halite (i.e., sodium chloride), and sodium sulfate. Due to the high dissolvability of these salts, the salts are dissolved into the heated fluid while leaving other salts behind. The heated fluid, now including the potassium containing salts, is then pumped to the surface for recovery and further processing.

Many solution mining operations utilize solar based evaporative ponds to evaporate water for recovery of the potassium containing salts. In some locations, reduced ambient temperatures associated with a mine location offers the ability to cool the fluid based on convective cooling between the fluid and ambient air. As the fluid cools, the saturation limits of the salts are reached and the salts begin to precipitate. As the salts precipitate out of solution, they settle to the bottom of the cooling pond where floating surface dredges can be used to scoop and remove the precipitates from the cooling ponds. The potassium containing salts can then be directed to a processing facility, where they can be processed for transport and sale.

As the thermal characteristics of the cooling ponds have a direct impact on the amount of salts precipitated from solution, it would be advantageous to improve the cooling performance of existing cooling pond systems without requiring substantial investment or process interruption.

SUMMARY OF THE INVENTION

In a representative embodiment of the present invention, a cooling pond system according to the present invention can include one or more submerged dams to increase cooling performance within the cooling pond system. The cooling pond system can be utilized for the recovery of salt from a solution of salt, such as brine. The brine can be provided from any source of salt water or solution, such as an output from solution mining, a body of salt water, or any other source of a salt solution. For simplicity sake, solution mining is generally referred to; however, the inputs to the cooling pond system according to embodiments can be provided from any known source of salt solution.

Generally, the inclusion of one or more submerged dams within an existing cooling pond system can reduce an outflow temperature by about 1° F. to about 5° F. as compared to the same cooling pond system without any submerged dams. Generally, the submerged dams of the present invention acts as baffles to increase turbulence and vertical mixing within the cooling pond system, causing high temperature brine that is often stagnant and stratified at lower levels of the cooling ponds to be exposed to the surface for heat removal through surface convection. As the temperature is reduced throughout the cooling pond system, more of the potassium containing salts are precipitated from the brine solution resulting in increased production within the same cooling footprint.

In one representative embodiment, a cooling pond system comprises one or more cooling ponds. The cooling pond system can include one or more submerged dams in one or more of the cooling ponds. In some embodiments, the one or more submerged dams can have a dam length from about 25 feet to about 100 feet in length. In some embodiments, the one or more submerged dams can comprise a full width dam or alternatively, a wedge style dam extending only partially across the width of the cooling pond. In some embodiments, the one or more submerged dams can have a submerged depth from about 1 foot to about 4 feet measured from the top of the dam to the pond surface.

In another representative embodiment, a cooling pond system of the present invention can comprise a plurality of cooling ponds arranged in series. The cooling pond system can comprise one or more submerged dams within one or more of the cooling ponds. In some embodiments, the one or more submerged dams can have a submerged depth of about 1 foot to 3 feet measured from the top of the dam to the pond surface. Due to amount of precipitation in upstream ponds as compared to downstream ponds, some embodiments of the present invention can include upstream ponds with one or more submerged dams having an increased submerged depth as compared to downstream ponds with one or more submerged dams having a reduced submerged depth.

In another representative embodiment, the present invention can comprise a method for increasing cooling, and consequentially, precipitation, within a cooling pond system. The method can comprise forming one or more submerged dams within one or more cooling ponds. In some embodiments, the method of forming can include forming one or more full width dams within the one or more cooling ponds while in an alternative embodiment, the method of forming can include forming one or more wedge style dams that do not span the full width of the one or more cooling ponds. In some embodiments, the method of forming can including forming the one or more submerged dams so as to have a submerged depth from about 1 foot to about 3 feet in depth. In some embodiments, the method of forming can include dredging a precipitate deposit to form the one or more submerged dams. In some embodiments, the method of forming can include pumping a slurry into the cooling pond to form the one or more submerged dams. In yet other embodiments, the one or more submerged dams can be formed utilizing other construction material including, for example, gravel, rock, boulders, polymeric materials such as polyethylene blocks, byproduct or waste materials such as unwanted or unusable precipitate, and the like or combinations thereof.

In a representative alternative embodiment of the present invention, a cooling pond system can be constructed including one or more cooling ponds for cooling a brine solution so as to cause potassium containing salts to precipitate out of solution. Each cooling pond comprises a pond depth defined between a pond floor and a pond surface. In some embodiments, a top surface of a layer of product or precipitated salt settled on the pond bottom defines the pond floor. The pond depth can be selectively increased or decreased to change the cooling behavior of each pond by increasing or decreasing flow velocity, thereby increasing or decreasing the Reynolds number. By increasing brine solution mixing, pond cooling can be adjusted by changing convective and evaporative heat loss at the pond surface. In some embodiments, pond depth can be selectively adjusted to capitalize on or take advantage of the higher driving forces based on seasonal changes, such as cooler and/or drier ambient air, or in other words, the higher driving forces present at particular seasons of the year.

In another representative embodiment, a method for varying precipitation rates of potassium containing salts in a cooling pond system can comprise a step of selectively adjusting a pond depth to vary a flow velocity and Reynolds number. In one representative embodiment, the method can comprise a step of reducing pond depth to increase flow velocity and the Reynolds number. By increasing the Reynolds number, brine solution mixing is enhanced leading to increased conductive and evaporative heat losses at a pond surface, whereby cooling is enhanced and potassium containing salt precipitation is increased. In another representative embodiment, the method can comprise a step of increasing pond depth to decrease flow velocity and the Reynolds number. By lowering the Reynolds number, brine solution mixing is reduced leading to reductions in conductive and evaporative heat losses at the pond surface, whereby cooling is suppressed and potassium containing salt precipitation is decreased. In some embodiments, the step of selectively adjusting the pond depth can further comprise seasonally adjusting the pond depth to control potassium containing salt precipitation based on seasonal changes to ambient conditions impacting cooling pond performance, i.e. air temperature, relative humidity, wind speed and the like with the goal of maximizing pond production or optimizing production based on customer demand for product.

In another representative embodiment, a method for controlling cooling pond performance, such as, but not limited to, in a solution mining operation, can comprise tailoring a pond depth of a cooling pond to selectively increase or decrease potassium containing salt precipitation.

In yet another representative embodiment, a method for seasonally adjusting precipitation rates in a cooling pond system can comprise selectively adjusting a pond depth based on changes to ambient weather conditions, for example, temperature, relative humidity and wind speed, that impact cooling pond performance.

The materials and methods described above are not limited to solution mining of potash and potassium containing salts. The materials and methods according to embodiments can be used with any types of solution mining processes and systems, or other sources of brine or salt solution in which salt recovery or precipitation is desired. The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

Various embodiment of the invention are now described by way of example to further the understanding of the present disclosure, with reference to the accompanying drawings in which.

Figure 1:
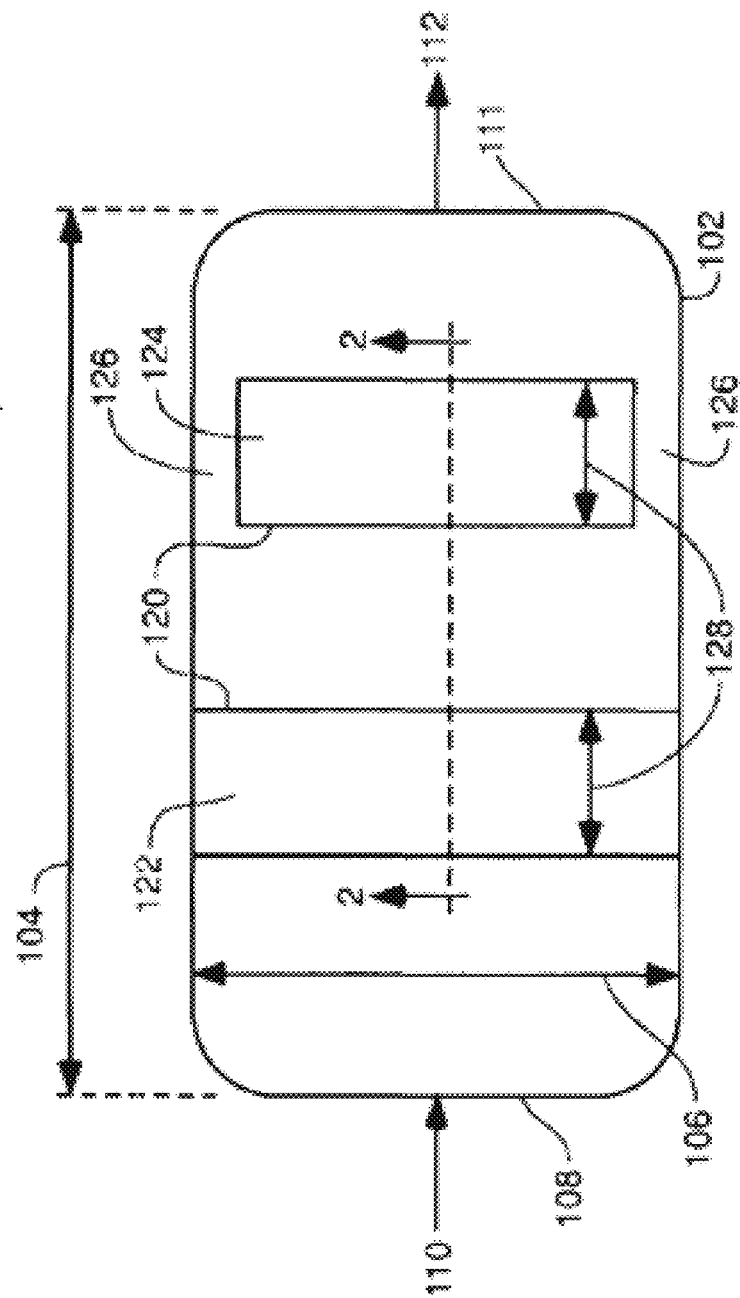
FIG. 1 is a top view of a cooling pond according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Embodiments of the present disclosure relate generally to cooling pond systems for use with a source of salt solution or brine, such as, for example, from solution mining, a body of salt water, a crystallizer circuit or return stream, or any other suitable source of salt water in which salt recovery is desired. More specifically, the embodiments are directed to placing one or more submerged dams and/or to adjusting cooling pond depth. The pond depth and cooling dam systems, used alone or in combination, enhance surface convection of the ponds and/or control flow mixing, thereby increasing salt production.

Cooling Dams

Referring now to FIG. 1, a representative cooling pond 100 of the present invention can comprise a lined pond 102 having a pond length 104 and a pond width 106. Generally, the cooling pond 100 can include an upstream end 108 having a brine inlet stream 110 and a downstream end 111 having a brine outlet stream 112. Generally, the brine inlet stream 110 comprises a heated brine solution at or near saturation that is pumped from a potash cavern, crystallizer overflow or other similar refinery overflow stream and can include potassium containing salts including, for example, sylvite (i.e., potash) halite (i.e., sodium chloride), and sodium sulfate as well as various impurities such as calcium chloride, calcium sulfate, magnesium chloride, magnesium sulfate and the like. The brine outlet stream 112 generally comprises a cooled brine solution in which commercial practical amounts of the potassium containing salts have been removed through precipitation as the heated brine solution cools.

As seen in FIG. 1, cooling pond 100 can comprise one or more submerged dams 120 across the pond width 106. The submerged dams 120 can comprise a full width dam 122 extending across the full pond width 106. Alternatively, the submerged dams can comprise a wedge-style dam 124 extending across a portion of the pond width 106 and having a dam opening 126. Each of the submerged dams 120 has a dam length 128. In various embodiments of the present invention, dam length 128 can be from about 25 feet to about 100 feet in width.

Figure 2:
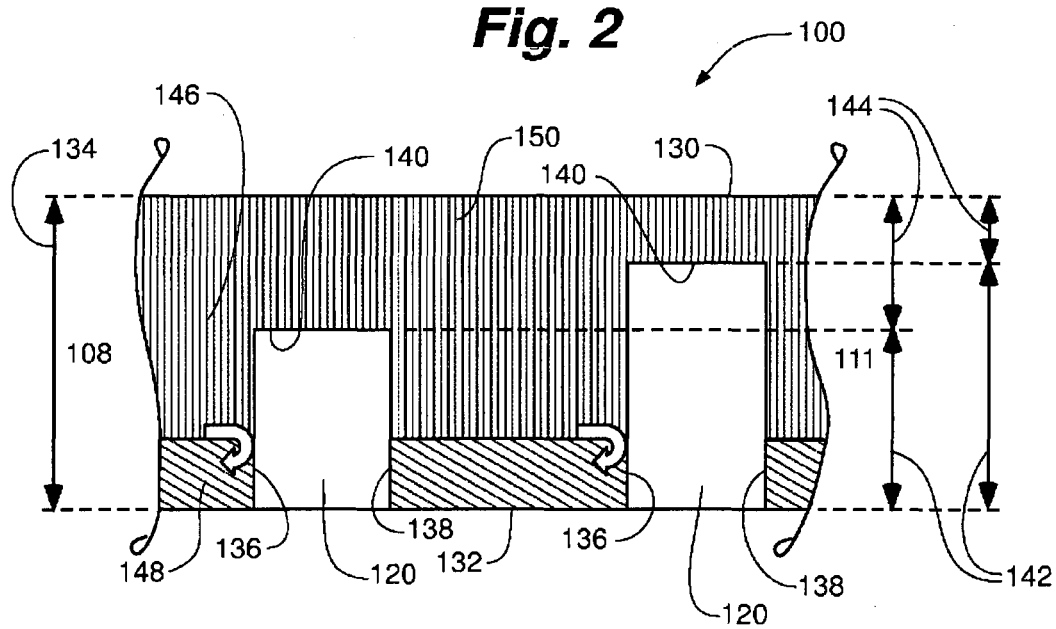
FIG. 2 is a partial section view of the cooling pond of FIG. 1.

Referring now to FIG. 2, cooling pond 100 generally has a pond surface 130, a pond floor 132 and a pond depth 134. The submerged dams 120 generally have an upstream wall 136, a downstream wall 138 and an upper dam surface 140. A dam height 142 is defined between the pond floor 132 and the upper dam surface 140. A submerged depth 144 is defined between the pond surface 130 and the upper dam surface 140. In various embodiments of the present invention, submerged depth 144 can be from about 1 foot to about 3 feet. Within cooling pond 100, a brine solution 146 generally has various brine stratification levels with a more highly concentrated or denser brine solution 148 proximate the pond floor 132 and less concentrated less dense brine solution 150 proximate the pond surface 130.

In its simplest form, cooling pond 100 operates by having brine inlet stream 110 enter the lined pond 102 at upstream end 108 as shown in FIG. 1. Generally, brine inlet stream 110 can be supplied from a solution mining operation or cavern and includes dissolved potassium containing salts. As the brine inlet stream 110 travels along the pond length 104 from the upstream end 108 to the downstream end 111, the brine solution 146 proximate pond surface 130 experiences convection cooling that causes the brine solution 146 to cool. As the brine solution 146 cools, the solubility limit of the potassium containing salts within the brine solution 146 drops to the point that potassium containing salts in excess of the solubility limit precipitate out of solution and accumulate on the pond floor 132.

In order to maximize cooling, one or more submerged dams 120 are formed across the pond width 106. Generally, the submerged dams 120 disrupt the brine stratification levels by increasing the Reynolds number of the brine inlet stream 110 as is reaches the submerged dam 120, thus increasing turbulence and mixing of the brine solution 146. By increasing turbulence and mixing, the denser brine solution 148, which is consequently at a higher temperature than the less dense brine solution 150, is vertically mixed and encouraged to rise to the pond surface 130. Due to the increase temperature differential between the ambient air and denser brine solution 148, the cooling rate is increased for the brine solution 146. With the increased cooling rate for brine solution 146, the solubility limit of the brine solution 146 is further decreased resulting in increased precipitation of the potassium containing salts.

Figure 3:
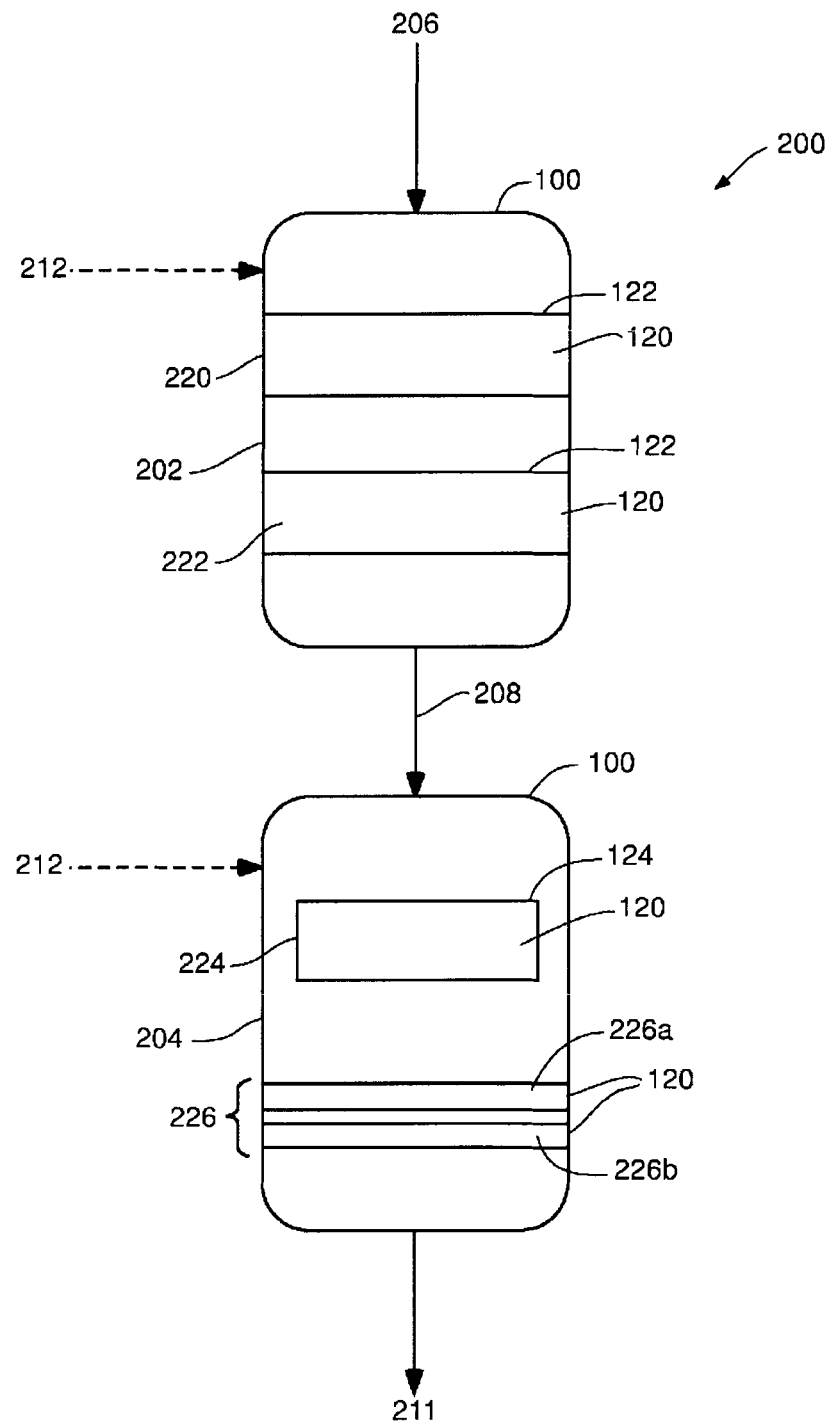
FIG. 3 is a schematic illustration of a cooling pond system according to an embodiment of the present invention.

Referring now to FIG. 3, a cooling pond system 200 according to an embodiment of the present invention can comprise a plurality of cooling ponds 100, for example, an upstream cooling pond 202 and a downstream cooling pond 204. It will be understood that cooling pond system can comprise any number of cooling ponds 100 with factors such as available space, capital resources and various brine solution parameters being relevant to the design of cooling pond system 200. Generally, cooling pond system 200 includes a brine inlet stream 206, an intermediate pond stream 208, and a brine outlet stream 211. In addition, cooling pond system 200 may comprise one or more refinery overflow streams 212 into one or both of the upstream cooling pond 202 and downstream cooling pond 204. Refinery overflow streams 212 can comprise processed streams from a crystallizer or other refinery processes and can include brine concentrations that exceed unprocessed inlet streams from the potash cavern.

Figure 4:
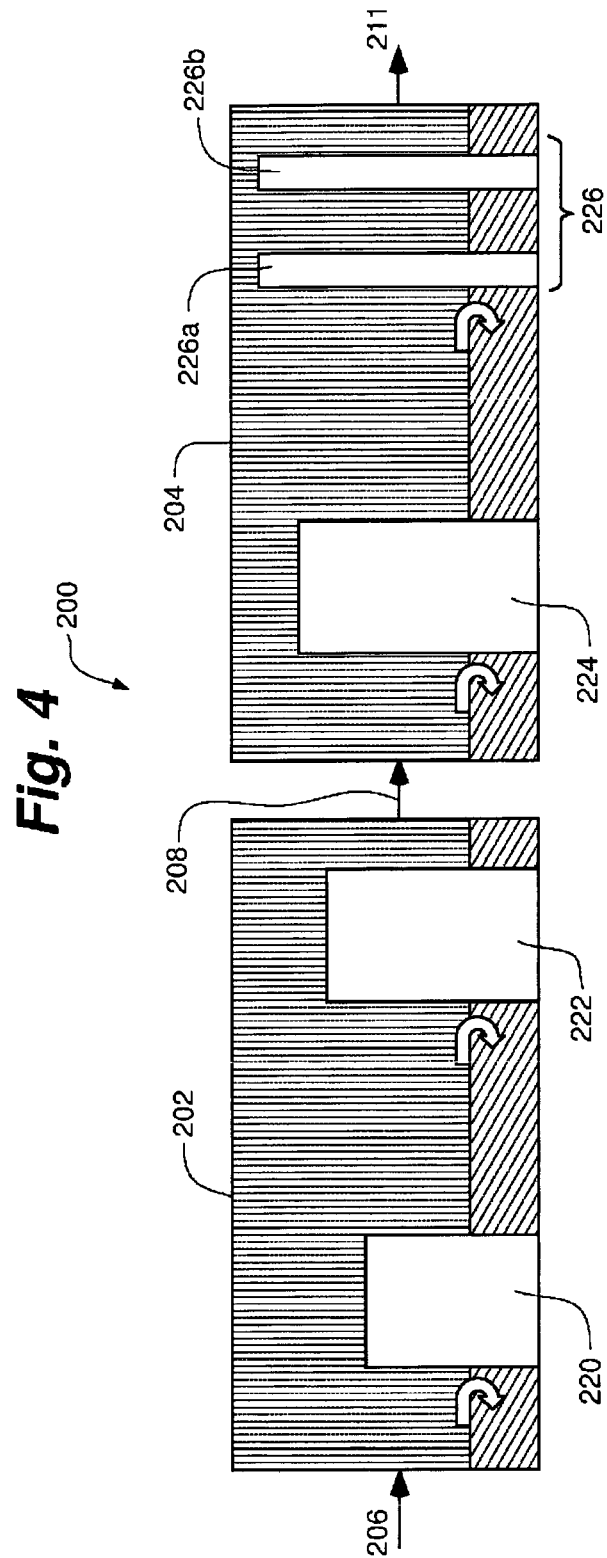
FIG. 4 is an elevational view of a cooling pond system with various submerged dams according to an embodiment of the invention.

As seen in FIG. 3, one or more submerged dams 120 can be positioned throughout the cooling pond system 200 to accelerated cooling of brine solution 146. As seen in FIGS. 3 and 4, a variety of different configurations can be used for each of the submerged dams 120. For example, upstream cooling pond 202 can include a first submerged dam 220 and a second submerged dam 222. As illustrated, each of the first and second submerged dams 220, 222 are full width dams 122 spanning the entire pond width 106 of the upstream cooling pond 202. Generally, the first and second submerged dams 220, 222 can have dam lengths of between about 25 feet to about 100 feet. Downstream cooling pond 204 can comprise a third submerged dam 224 and a fourth submerged dam 226. As illustrated, third submerged dam 224 can comprise a wedge-style dam 124. Fourth submerged dam 226 can essentially comprise two reduced width dams 226a, 226b, for example, two 25 foot width dams, that occupy the space of a single submerged dam with a 100 foot dam length.

As seen in FIG. 4, the various submerged dams within cooling pond system 200 can be constructed so as to have varying submerged depths 144 dependent on their location within the cooling ponds system 200 and based upon expected production or pond "loading". For example, as the brine solution 146 moves from an upstream location to a downstream location, the potassium containing salts will precipitate, thus reducing the concentration as the brine solution 146 moves downstream. However, the greater temperature differential between the upstream locations and ambient air provides for a greater amount of cooling in the upstream locations and results in precipitated potassium containing salts accumulating faster in upstream locations than in downstream locations. While the concentration of brine solution 146 drops as you move from an upstream to a downstream location, the cooling of the brine solution 146 causes the brine solution 146 to remain at saturation. In order to preserve throughput of the cooling pond system 200, it may be advantageous to have a larger submerged depth 144 for upstream dams as opposed to downstream dams to provide more area for accumulation of the potassium containing salts on upstream dams. For instance, first submerged dam 220 can have a submerged depth 144 of about 5 feet, second submerged dam 222 can have a submerged depth 144 of about 3.5 feet, third submerged dam 224 can have a submerged depth 144 of about 2 feet and the fourth submerged dam 226 can have a submerged depth 144 of about 1 foot. In order to promote convective cooling, maintaining a minimal submerged depth 144 is advantageous though this advantage must be weighed against expected pond loading (potassium containing salt precipitate accumulation) and available dredging capacity.

Figure 5:
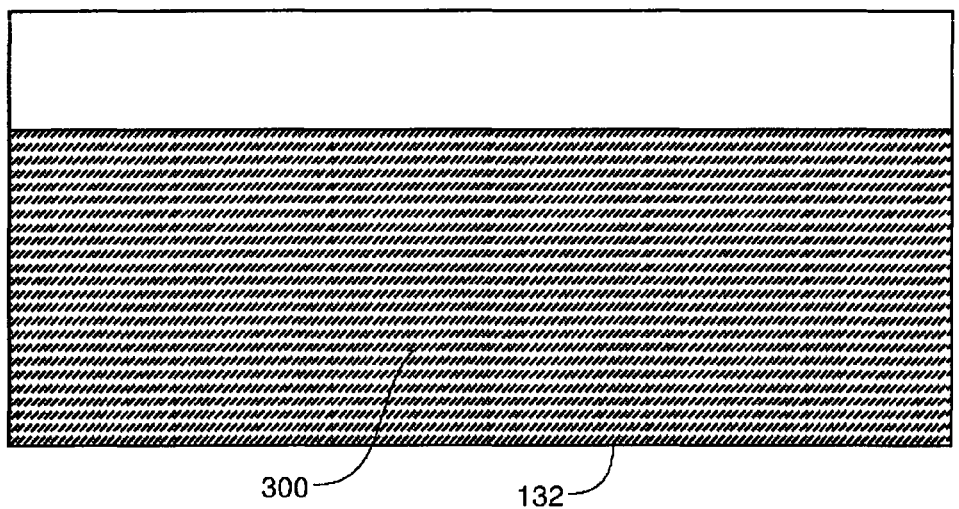
FIG. 5 is an elevational view of a cooling pond according to an embodiment of the invention.
Figure 6:
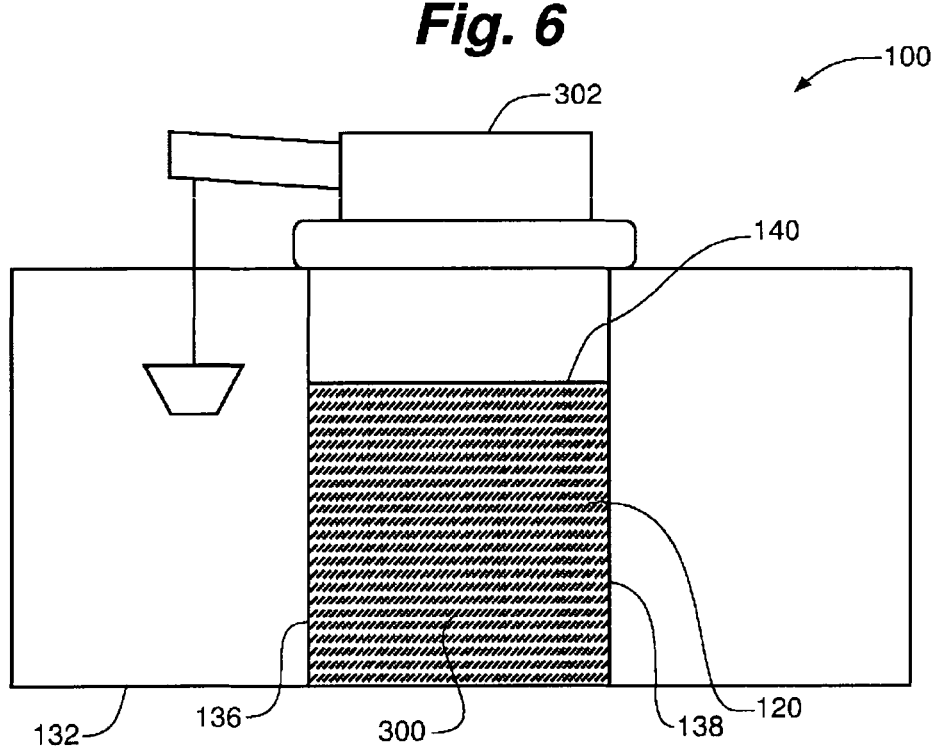
FIG. 6 is an elevational view of the cooling pond of FIG. 5 with a floating dredge.
Figure 7:
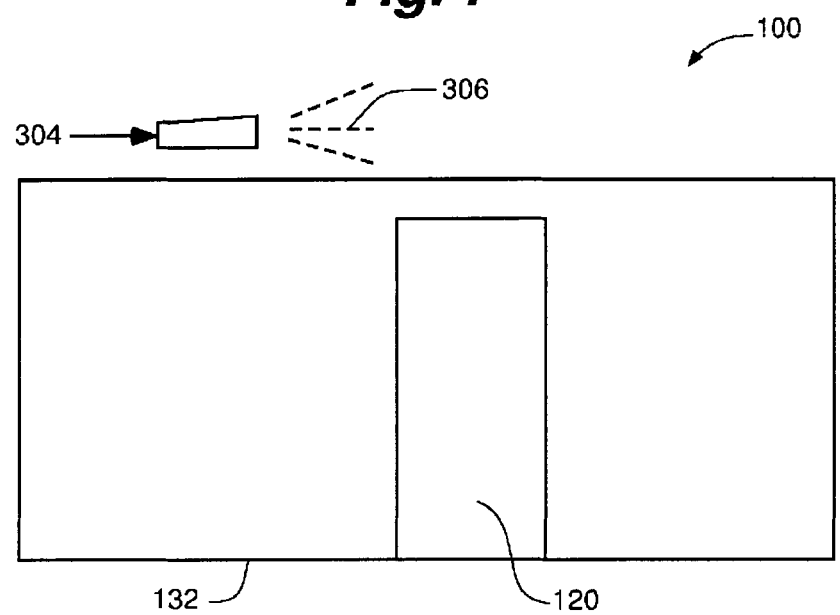
FIG. 7 is an elevational view of a cooling pond with a slurry spray system according to an alternative embodiment of the invention.

Submerged dams 120 can generally be formed in a variety of ways. For instance, cooling pond 100 can have a precipitate layer 300 that has been deposited and accumulated on pond floor 132 as shown in FIG. 5. Utilizing a floating dredge 302 as shown in FIG. 6, the precipitate layer 300 can be dredged so as to form upstream wall 136, downstream wall 138 and upper dam surface 140 from the precipitate layer 300 itself. As time goes on, floating dredge 302 can be utilized to reform new submerged dams 120, with older submerged dams being dredged and sent for processing. In an alternative embodiment shown in FIG. 7, one or more slurry streams 304 can be used to spray a slurry solution 306 that can settle onto the pond floor 132 and form the submerged dam 120.

Figure 8:
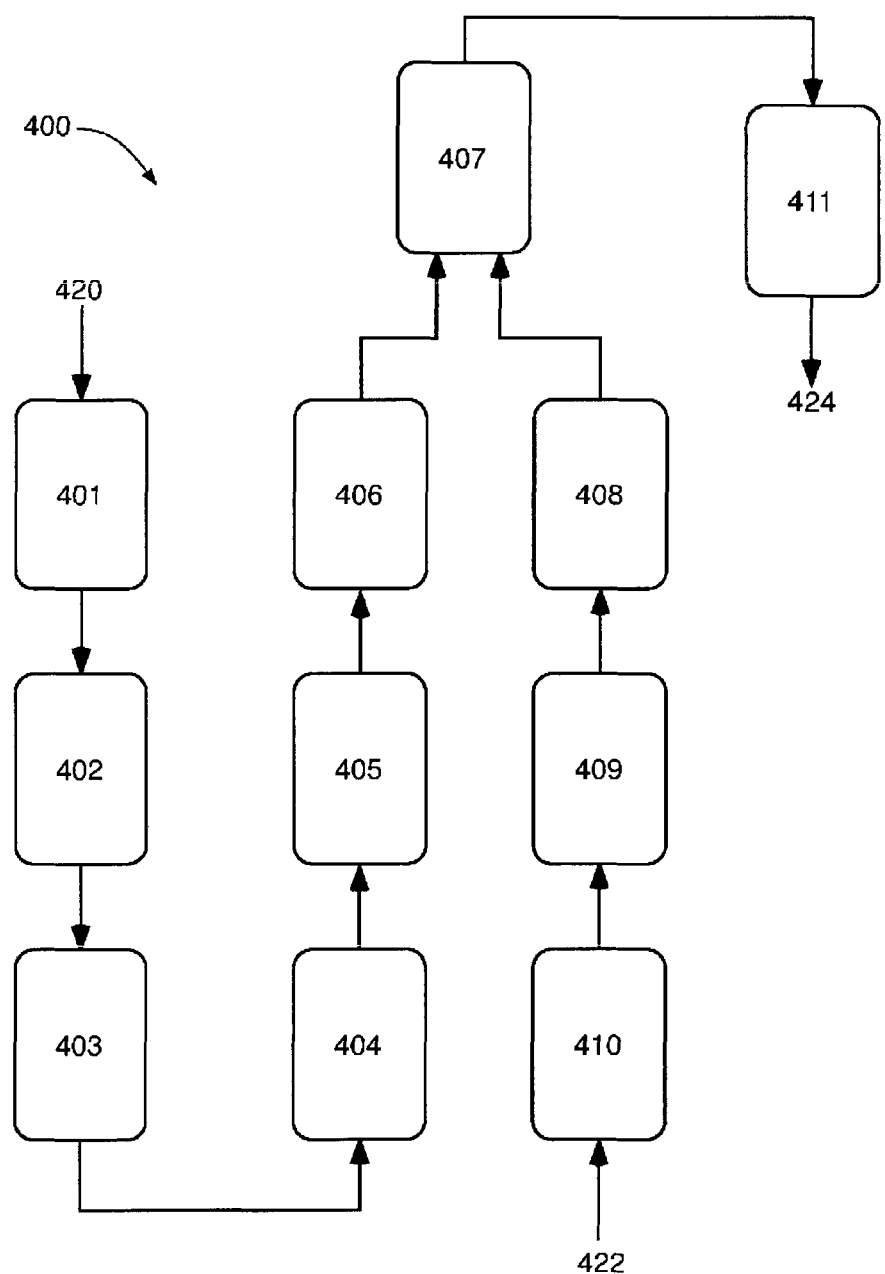
FIG. 8 is a top view of a cooling pond system according to an embodiment of the invention.

Referring now to FIG. 8, the use and advantages of submerged dams 120 was dynamically modeled for an existing cooling pond system 400. Cooling pond system 400 generally comprises a total of eleven cooling ponds illustrated as cooling ponds 401, 402, 403, 404, 405, 406, 407, 408, 409, 410, and 411 respectively. Cooling ponds system 400 comprises a brine inlet stream 420, a refinery overflow stream 422 and an outlet stream 424. The cooling performance of cooling pond system 400 was modeled for three different scenarios as described in Table 1 below:

TABLE 1

| Scenario | Submerged Dams | Configuration of Submerged Dams |
|---|---|---|
| 1 | No | N/A |
| 2 | Yes | Pond 402: (3) submerged dams, 100 foot dam length, 4 foot submerged depth |
| | | Pond 403: (2) submerged dams, 100 foot dam length, 4 foot submerged depth |
| | | Pond 404: (2) submerged dams, 100 foot dam length, 4 foot submerged depth |
| | | Pond 405: (2) submerged dams, 100 foot dam length, 4 foot submerged depth |
| | | Pond 406: (2) submerged dams, 100 foot dam length, 4 foot submerged depth |
| | | Pond 407: (2) submerged dams, 100 foot dam length, 4 foot submerged depth |
| | | Pond 408: (2) submerged dams, 100 foot dam length, 4 foot submerged depth |
| | | Pond 409: (3) submerged dams, 100 foot dam length, 4 foot submerged depth |
| 3 | Yes | Pond 402: (3) submerged dams, 100 foot dam length, 3 foot submerged depth |
| | | Pond 403: (2) submerged dams, 100 foot dam length, 3 foot submerged depth |
| | | Pond 404: (2) submerged dams, 100 foot dam length, 1 foot submerged depth |
| | | Pond 405: (2) submerged dams, 100 foot dam length, 1 foot submerged depth |
| | | Pond 406: (2) submerged dams, 100 foot dam length, 1 foot submerged depth |
| | | Pond 407: (2) submerged dams, 100 foot dam length, 1 foot submerged depth |
| | | Pond 408: (2) submerged dams, 100 foot dam length, 3 foot submerged depth |
| | | Pond 409: (3) submerged dams, 100 foot dam length, 3 foot submerged depth |

* For each scenario, the characteristics including flow rate, temperature and brine solution concentration for brine inlet stream 420 and recycle stream 422. In Scenarios 2 and 3, the submerged dams 120 each had full width construction. Furthermore, ambient temperature air temperature and wind speeds were maintained between the scenarios. Each pond has a pond depth 134 of 9 feet.

The cooling performance and consequently, production increase percentage (precipitate production) for Scenarios 2 and 3 as compared to Baseline Scenario 1 are summarized in Table 2 below:

TABLE 2

| Scenario | Outlet Stream 424 Temperature (° F.) | Production Increase (% gain) |
|---|---|---|
| 1 | 31.6 | N/A |
| 2 | 28.7 | 5.3% |
| 3 | 28.0 | 8.1% |

As illustrated in Tables 1 and 2, the use of submerged dams 120 within cooling pond systems increases the cooling capacity of the cooling pond system and results in an increase in the amount of potassium containing salts recovered from the cooling ponds system. Furthermore, the construction of submerged dams 120 having a reduced submerged depth can further increase cooling production and product recovery. However, the submerged depth must be compared to other operational conditions including dredging capacity and product capacity to determine the best design for submerged dams 120 within any particular cooling pond system.

Pond Depth

Figure 9:
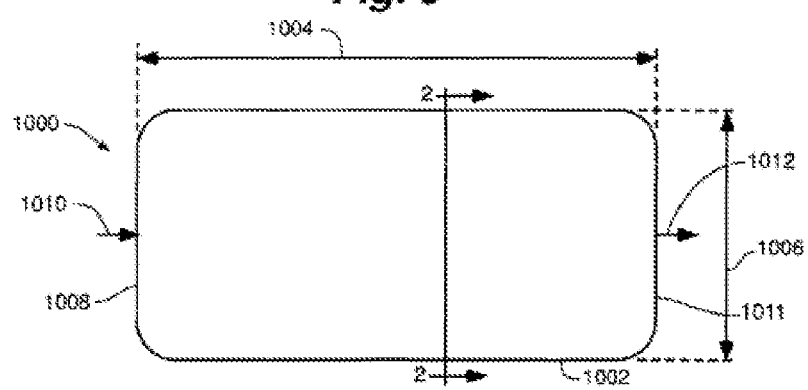
FIG. 9 is a top view of a cooling pond system according to an alternative embodiment of the present invention.
Figure 10:
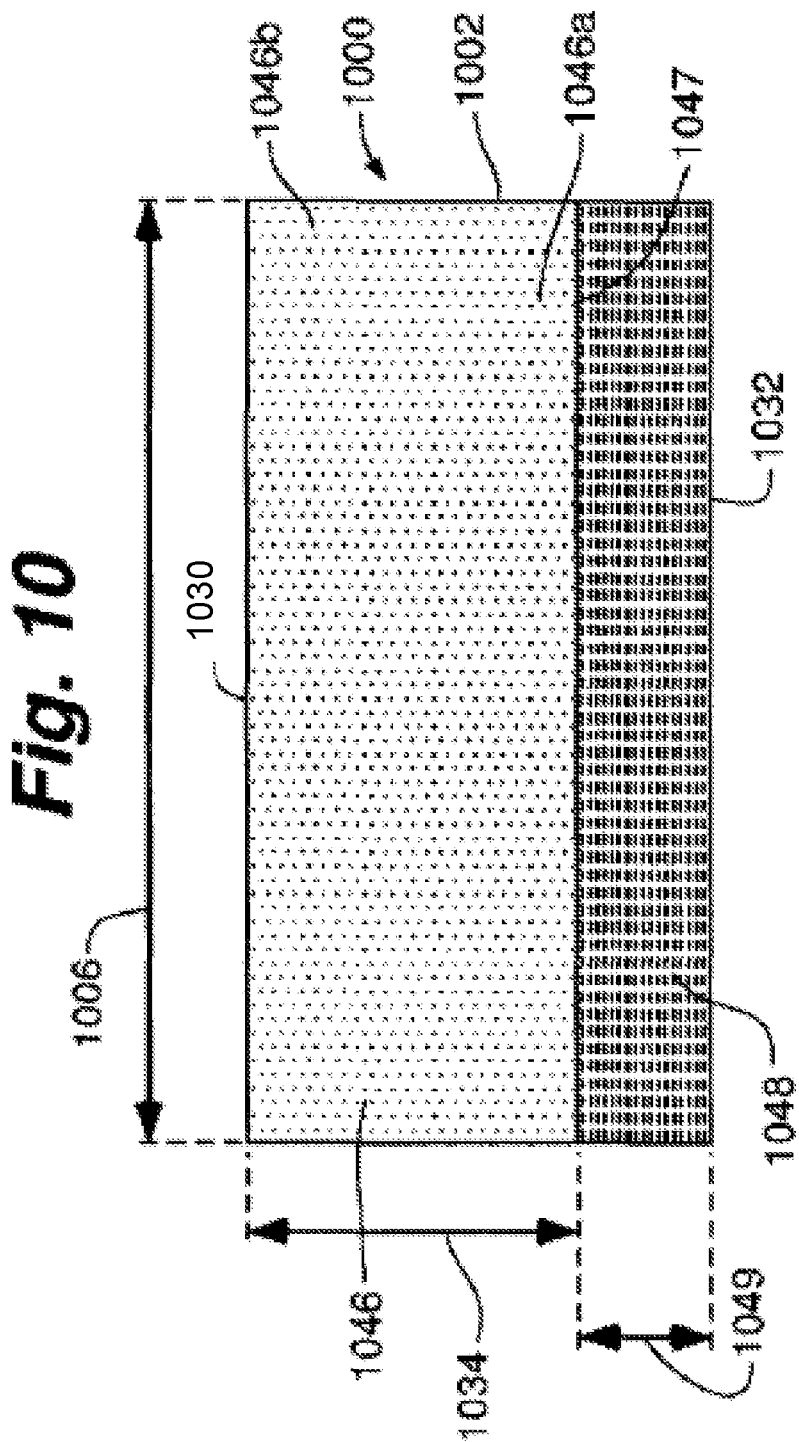
FIG. 10 is a section view of the cooling pond system of FIG. 9 taken at Line 2-2 of FIG. 9.

Referring now to FIGS. 9 and 10, a representative cooling pond 1000 of the present invention can comprise a lined pond 1002 having a pond length 1004 and a pond width 1006. Generally, the cooling pond 1000 can include an upstream end 1008 having a brine inlet stream 1010 and a downstream end 1011 having a brine outlet stream 1012. Generally, the brine inlet stream 1010 comprises a heated brine solution at or near saturation that is pumped from a potash cavern, crystallizer overflow and/or other similar refinery overflow stream, and can include potassium containing salts including, for example, sylvite (i.e., potash), halite (i.e., sodium chloride), and sodium sulfate as well as various impurities such as calcium chloride, calcium sulfate, magnesium chloride, magnesium sulfate, and the like. The brine outlet stream 1012 generally comprises a cooled brine solution in which commercially practical amounts of the potassium containing salts have been removed through precipitation as the heated brine solution cools.

Referring now to FIG. 10, cooling pond 1000 generally has a pond surface 1030, and a pond bottom 1032. A layer of product settles on pond bottom 1032, thereby defining a pond floor 1048 having a floor height 1049. Within cooling pond 1000, a brine solution 1046 rests above floor 1048 at a height measured from the pond surface 1030 to a top surface 1047 of floor 1048, thereby defining a pond depth 1034. Brine solution generally has various brine stratification levels with a more highly concentrated or denser brine solution 1046a proximate the top 1047 of floor 1048 and less concentrated or less dense brine solution 1046b proximate the pond surface 1030.

In its simplest form, and as described above with respect to the cooling dam embodiments, cooling pond 1000 operates by having brine inlet stream 1010 enters the lined pond 1002 at upstream end 1008 as shown in FIG. 9. Generally, brine inlet stream 1010 can be supplied from a solution mining operation or cavern and includes dissolved potassium containing salts. As the brine inlet stream 1010 travels along the pond length 1004 from the upstream end 1008 to the downstream end 1011, the brine solution 1046, and more particularly in a stratified system, the less dense portion proximate pond surface 1030 experiences convection cooling that causes the brine solution 1046 to cool. As the brine solution 1046 cools, the solubility limit of the potassium containing salts within the brine solution 1046 drops to the point that potassium containing salts in excess of the solubility limit precipitate out of solution and accumulate on the pond floor 1032 as floor 1048. In one particular embodiment, as floor 1048 builds up, and its height 1049 increases, product 1048 or a portion thereof is not removed as an alternative method of adjusting pond depth. In yet another alternative embodiment, a portion of floor 1048 is shaped to form one or more submerged dams 120, as described above.

In order to enhance the cooling performance of the cooling pond 1000, increased mixing between the stratified layers, or the denser brine solution 1046a proximate the top 1047 of floor 1048 and less concentrated or less dense brine solution 1046b proximate the pond surface 1030 can be promoted. Mixing can be increased to increase the Reynolds number such that flow within the cooling pond 1000 is more turbulent, which in turn results in increased heat loss by convection. One method of increasing the Reynolds number can involve increasing the flow velocity of the brine solution 1046 through the cooling pond 1000. With a cooling pond 1000 that has a fixed pond width 1006, velocity of the brine solution 1046 can be increased by decreasing the pond depth 1034 while maintaining the volume of the brine inlet stream 1010 and the brine outlet stream 1012.

Figure 11:
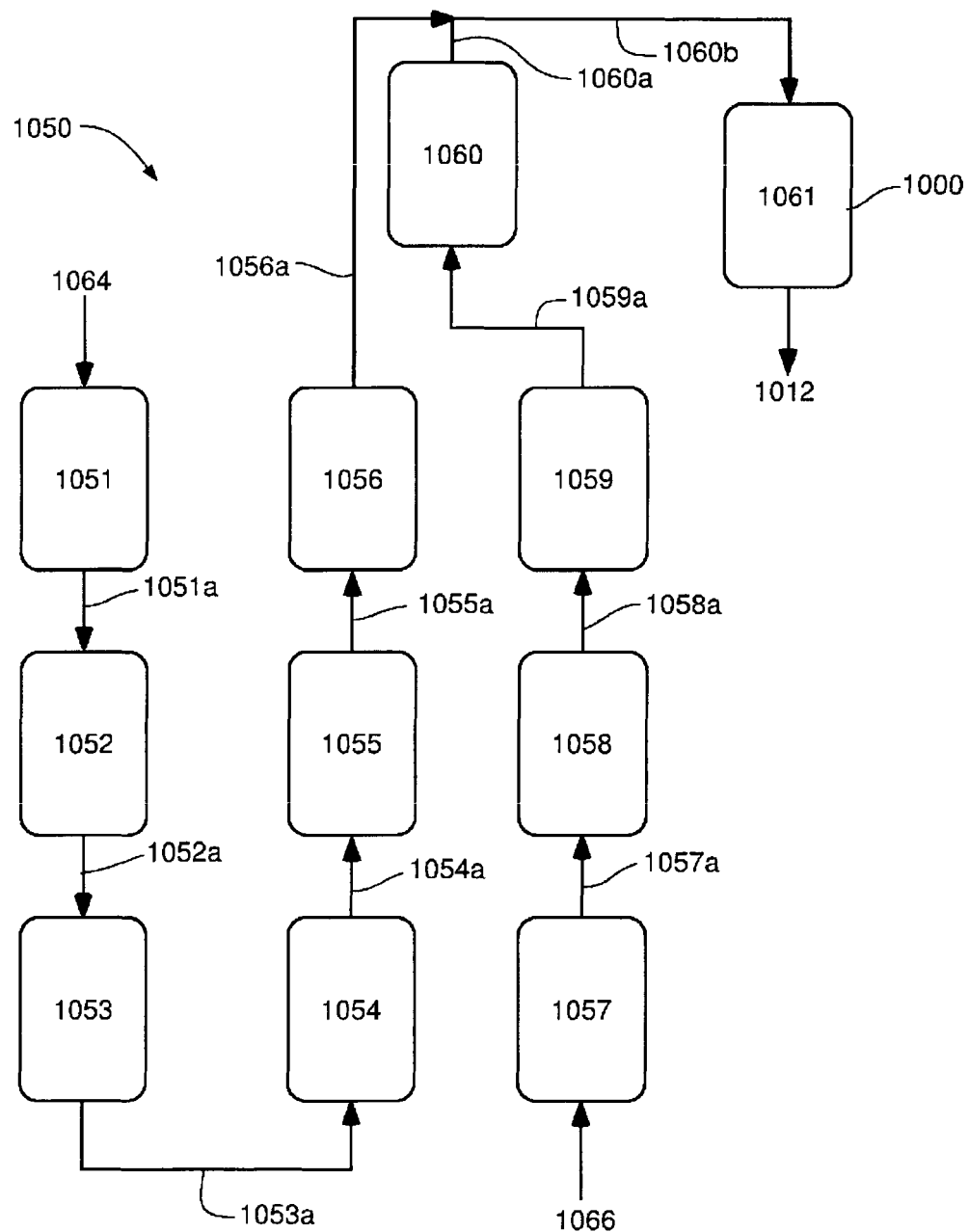
FIG. 11 is a schematic view of a cooling pond system according to an embodiment of the present invention.

In an actual processing environment, a cooling pond system 1050 for the precipitation of potassium containing salts typically involves a plurality of interlinked cooling ponds 1000 as shown in FIG. 11. For example, cooling pond system 1050 can comprise a total of eleven cooling ponds 1000 including cooling ponds 1051, 1052, 1053, 1054, 1055, 1056, 1057, 1058, 1059, 1060, and 1061. Cooling ponds 1051, 1052, 1053, 1054, 1055, 1056, 1057, 1058, 1059, 1060, and 1061 can be arranged serially, in parallel, or in a combination of serial and parallel layouts. Cooling pond system 1050 can include a plurality of brine inlet streams 1010 including, for example, a first inlet stream 1064 and a second inlet stream 1066. Each inlet stream 1064 and 1066 can comprise, for example, a brine stream directly from the mining cavern, i.e. raw feed from the cavern (CRF), a brine stream from the crystallizer/refinery overflow (XLR O/F), or combinations thereof. In certain embodiments, both first and second inlet streams are a combination of CRF and XLR O/F.

In one particular embodiment, depicted in FIG. 11, first and second inlet streams 1064 and 1066 are combined into a single stream 1060b after each passing through one or more cooling ponds. Specifically as shown in FIG. 11, stream 1064 passes through cooling ponds 1051, 1052, 1053, 1054, 1055, and 1056, and exits pond 1056 as stream 1056a. Stream 1066 passes through cooling ponds 1057, 1058, 1059, and 1060, and exits pond 1060 as stream 1060a. Streams 1056a and 1060a are then combined as stream 1060b, which enters pond 1061, before exiting system 1050 as outlet stream 1012.

The effects of different pond depths 1034 are demonstrated further in the non-limiting examples set forth below.

Example 1

In a first example, cooling pond system 1050 was modeled with cooling ponds 1051, 1052, 1053, 1054, 1055, 1056, 1057, 1058, 1059, 1060, and 1061 having pond depths 1034 of 9 feet, 6.5 feet and 5 feet. For purposes of the model, an effective pond depth 1034 was assumed to be equal within each of the cooling 1051, 1052, 1053, 1054, 1055, 1056, 1057, 1058, 1059, 1060, and 1061. The model was constructed for both summer and winter processing conditions with the summer results presented in Table 3 and the winter results present in Table 4.

TABLE 3

Results Assuming Summer Processing Conditions.

| Pond Depth (feet) | Ambient Air Temperature (° F.) | Ambient Relative Humidity (%) | Average Windspeed (km/h) | % Change decrease temperature (from average of inlets 1064 and 1066 to outlet 1012) |
|---|---|---|---|---|
| 9 | 61.5 | 65 | 20 | 21.6% |
| 6.5 | 61.5 | 65 | 20 | 29.8% |
| 5 | 61.5 | 65 | 20 | 31.7% |

TABLE 4

Results Assuming Winter Processing Conditions.

| Pond Depth (feet) | Ambient Air Temperature (° F.) | Ambient Relative Humidity (%) | Average Windspeed (km/h) | % Change decrease temperature (from average of inlets 1064 and 1066 to outlet 1012) |
|---|---|---|---|---|
| 9 | 8.8 | 75 | 20 | 52.3% |
| 6.5 | 8.8 | 75 | 20 | 57.2% |
| 5 | 8.8 | 75 | 20 | 61.0% |

The results of the summer and winter modeling summarized in Tables 3 and 4 demonstrate that cooling pond systems 1050 designed to have individual cooling ponds 1000 with shallower pond depths 1034 demonstrate increased cooling performance. Shallower cooling ponds 1000 have higher velocities as compared to a comparable cooling pond having increased depths. The higher velocities result in a higher Reynolds number within cooling pond 1000, thereby enhancing flow mixing throughout the vertical stratified brine column of brine solution 1046. With increased flow mixing, the brine temperature at pond surface 1030 is increased resulting in larger conductive and evaporative heat losses at the pond surface 130. Increasing heat loss at the pond surface 1030 through the cooling pond system 1050 directly impacts the brine outlet stream 1012 and ultimately leads to reduced brine outlet stream temperatures.

Example 2

In Example 2, a temperature profile was modeled relating to the cooling associated with first inlet stream 1064 through part of the cooling pond system 1050 before combining with the outlet stream 160a. With reference to FIG. 10, the impact of pond depth on brine outlet stream temperature for various brine outlet streams 1051a, 1052a, 1053a, 1054a, 1055a, and 1056a associated with their corresponding cooling pond 1051, 1052, 1053, 1054, 1055, and 1056 were modeled during both summer and winter conditions. Cooling ponds 1050, 1051, 1052, 1053, 1054, and 1055 were modeled with pond depths 1034 of 9 feet, 6.5 feet, and 5 feet. For purposes of the model, pond depth 1034 was assumed to be equal within each of the cooling ponds 1051, 1052, 1053, 1054, and 1055. The model for the heat transfer mechanism imposed on the brine as a bulk fluid (mother liquor) within the pond was constructed for both summer and winter processing and ambient conditions with the summer results presented in Table 5 and the winter results present in Table 6.

FIG. 3, the impact of pond depth on brine outlet stream temperature for various brine outlet streams 1057a, 1058a, 1059a, and 1060a associated with their corresponding cooling pond 1057, 1058, 1059, and 1060 were modeled during both summer and winter conditions. Cooling ponds 1057, 1058, 1059, and 1060 were modeled with pond depths 1034 of 9 feet, 6.5 feet, and 5 feet. For purposes of the model, pond depth 1034 was assumed to be equal within each of the cooling ponds 1057, 1058, 1059, and 1060. The model for second input stream 1066 was constructed for both summer and winter processing conditions with the summer results presented in Table 7 and the winter results present in Table 8.

TABLE 5

First Inlet Stream 1064 Cooling Assuming Summer Processing Conditions.

| Pond Depth (feet) | Ambient Air Temperature (° F.) | Ambient Relative Humidity (%) | Average Windspeed (km/h) | Δ Temp between 1064 and 1051a (° F.) | Δ Temp between 1051a and 1052a (° F.) | Δ Temp between 1052a and 1053a (° F.) | Δ Temp between 1053a and 1054a (° F.) | Δ Temp between 1054a and 1055a (° F.) | Δ Temp between 1055a and 1056a (° F.) | Total Δ Temp between 1064 and 1056a (° F.) |
|---|---|---|---|---|---|---|---|---|---|---|
| 9 | 61.5 | 65 | 20 | −7.7 | −5.1 | −3.8 | −3.2 | −2.3 | −2.0 | −24.1 |
| 6.5 | 61.5 | 65 | 20 | −8.7 | −5.4 | −4.0 | −3.4 | −2.3 | −2.0 | −25.8 |
| 5 | 61.5 | 65 | 20 | −9.4 | −5.9 | −4.1 | −3.4 | −2.4 | −1.9 | −27.1 |

TABLE 6

First Inlet Stream 164 Results Assuming Winter Processing Conditions.

| Pond Depth (feet) | Ambient Air Temperature (° F.) | Ambient Relative Humidity (%) | Average Windspeed (km/h) | Δ Temp between 1064 and 1051a (° F.) | Δ Temp between 1051a and 1052a (° F.) | Δ Temp between 1052a and 1053a (° F.) | Δ Temp between 1053a and 1054a (° F.) | Δ Temp between 1054a and 1055a (° F.) | Δ Temp between 1055a and 1056a (° F.) | Total Δ Temp between 1064 and 1056a (° F.) |
|---|---|---|---|---|---|---|---|---|---|---|
| 9 | 8.8 | 75 | 20 | −13.6 | −9.7 | −7.7 | −7.8 | −5.7 | −5.4 | −49.9 |
| 6.5 | 8.8 | 75 | 20 | −15.2 | −10.6 | −8.5 | −8.2 | −6.4 | −6.1 | −55.0 |
| 5 | 8.8 | 75 | 20 | −16.7 | −11.3 | −9.0 | −8.5 | −6.8 | −6.4 | −58.7 |

Example 3

In Example 3, a temperature profile was modeled relating to the cooling associated with second input stream 1066 through the part of the cooling pond system 1050 before combining with the outlet stream 1056a. With reference to

TABLE 7

Second Input Stream 1066 Results Assuming Summer Processing Conditions.

| Pond Depth (feet) | Ambient Air Temperature (° F.) | Ambient Relative Humidity (%) | Average Windspeed (km/h) | Δ Temp between 1066 and 1057a (° F.) | Δ Temp between 1057a and 1058a (° F.) | Δ Temp between 1058a and 1059a (° F.) | Δ Temp between 1059a and 1060a (° F.) | Total Δ Temp between 1064 and 1056a (° F.) |
|---|---|---|---|---|---|---|---|---|
| 9 | 61.5 | 65 | 20 | −4.5 | −3.4 | −3.0 | −2.4 | −13.3 |
| 6.5 | 61.5 | 65 | 20 | −4.9 | −3.8 | −3.3 | −2.5 | −14.5 |
| 5 | 61.5 | 65 | 20 | −5.5 | −4.0 | −3.5 | −2.5 | −15.5 |

TABLE 8

Second Input Stream 166 Results Assuming Winter Processing Conditions.

| Pond Depth (feet) | Ambient Air Temperature (° F.) | Ambient Relative Humidity (%) | Average Windspeed (km/h) | Δ Temp between 1066 and 1057a (° F.) | Δ Temp between 1057a and 1058a (° F.) | Δ Temp between 1058a and 1059a (° F.) | Δ Temp between 1059a and 1060a (° F.) | Total Δ Temp between 1064 and 1056a (° F.) |
|---|---|---|---|---|---|---|---|---|
| 9 | 8.8 | 75 | 20 | −9.1 | −7.4 | −6.7 | −5.6 | −28.8 |
| 6.5 | 8.8 | 75 | 20 | −9.2 | −9.1 | −7.4 | −6.4 | −32.1 |
| 5 | 8.8 | 75 | 20 | −9.2 | −10.7 | −7.9 | −7.0 | −34.8 |

In comparing the impact of pond depth 1034 to cooling performance for the above three examples, a comparison of the summer vs. winter results indicates that cooling performance relative to brine outlet stream 1012 is less sensitive to changes in pond depth 1034 during the summer months. It appears that the significantly higher ambient air temperature of the summer months results in a lower heat transfer driving force that negatively impacts cooling performance.

Based on the total cooling performance of the system 1050 as contained in Tables 3 and 4, production of potassium containing salts was modeled for both summer and winter periods assuming depths of 5 feet, 6.5 feet, and 9 feet. Estimated production levels are listed within Table 9.

TABLE 9

Potassium-Containing Salt Production % Gain

| Pond Depth 1034 (feet) | Winter Production % Gain (compared to 9 ft. depth production) | Summer Production % Gain (compared to 9 ft. depth production) |
|---|---|---|
| 9 | — | — |
| 6.5 | 11.9% | 6.4% |
| 5 | 21.0% | 11.4% |

Based on the production data of Table 9, one method for controlling or meeting production goals throughout the year is to adjust pond depth 1034 as opposed to increasing the input flow rates of the inlet streams 1010 including, for example, first inlet stream 1064 and second inlet stream 1066.

As described throughout supra, a cooling pond system of the present invention utilizes one or more submerged dams and/or variations in cooling pond depths to increase cooling performance and product recovery from a brine, including, but not limited, a cavern raw feed brine in solution mining operations, crystallizer overflow and/or refinery overflow streams in solution or traditional mining operations, a body of salt water, or any other source of brine. It is to be understood that the design of the cooling pond system is amenable to various modifications and alternative forms based upon available area, capital outlay and brine stream parameters. The intention is not to limit the present invention to the particular embodiments described and illustrated but instead to cover all modifications, equivalents, and alternatives falling within the spirit and scope of the present disclosure.

The invention claimed is:

1. A cooling pond system, comprising:
at least one cooling pond, the cooling pond having a brine inlet stream and an outlet stream, the cooling pond defining a pond length, a pond width and a pond depth; and
a submerged dam positioned across at least a portion of the pond width, the submerged dam having an upper dam surface, wherein the submerged dam is located entirely below a pond surface.

2. The cooling pond system of claim 1, wherein the submerged dam extends fully across the pond width.

3. The cooling pond system of claim 1, wherein the submerged dam extends only across a portion of the pond width, said at least one submerged dam defining a dam opening.

4. The cooling pond system of claim 1, wherein the upper dam surface is positioned below the pond surface at a depth of about 1 foot to about 5 feet in depth.

5. The cooling ponds system of claim 1, wherein the pond is filled with a brine solution, said brine solution wherein a more concentrated brine layer resides proximate a pond floor, and wherein the submerged dam causes an increase in a Reynolds number or vertical mixing of the brine solution such that the more concentrated brine layer is forced to the pond surface.

6. The cooling pond system of claim 1, wherein the at least one cooling pond includes at least an upstream cooling pond and a downstream cooling pond.

7. The cooling pond system of claim 6, wherein the upstream cooling pond includes at least one submerged dam according to claim 1, and the downstream cooling pond includes at least one submerged dam according to claim 1.

8. The cooling pond system of claim 7, wherein the submerged dam in the upstream cooling pond has a submerged depth from about 3 feet to about 5 feet.

9. The cooling pond system of claim 8, wherein the submerged dam in the downstream cooling pond has a submerged depth from about 1 foot to about 4 feet.

10. The cooling pond system of claim 1, further comprising a plurality of the submerged dams according to claim 1.

11. A method for increasing salt recovery in a cooling pond system, comprising:
increasing a Reynolds number of a brine flow stream within one or more cooling ponds to increase convective cooling of the brine flow stream, thereby increasing salt precipitation from the brine stream, wherein each of the one or more cooling ponds has a precipitated salt layer formed on a bottom surface of the pond, and a volume of brine solution over the precipitated salt layer, wherein a pond depth is measured from a top surface of the precipitated salt layer to a top surface of the brine solution,
wherein increasing the Reynolds number comprises:
forming at least one submerged dam within the pond, wherein the at least one submerged dam is positioned across at least a portion of a pond width, the at least one submerged dam having an upper dam surface located below a pond surface; and
actively controlling the pond depth within the one or more cooling ponds to optimize cooling of the brine flow stream through the cooling pond system.

12. The method of claim 11, wherein controlling the pond depth comprises:
decreasing the pond depth within the one or more cooling ponds.

13. The method of claim 12, wherein the pond depth is decreased from 9.0 feet to 6.5 feet.

14. The method of claim 13, wherein the pond depth is decreased to 5.0 feet.

15. The method of claim 11, wherein actively controlling the pond depth comprises adjusting the distance between the upper dam surface and the pond surface to increase an amount of the salt precipitation by at least 10%.

16. The method of claim 11, wherein the at least one submerged dam extends fully across the pond width.

17. The method of claim 11, wherein the at least one submerged dam extends only across a portion of the pond width, said at least one submerged dam defining a dam opening.

18. The method of claim 11, wherein the upper dam surface is positioned below the pond surface at a depth of about 1 foot to about 5 feet in depth.

* * * * *